（12） United States Patent
Jiang et al.

(10) Patent No.: US 9,332,813 B2
(45) Date of Patent: May 10, 2016

(54) PROTECTION CASE FOR ELECTRONIC DEVICE

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Peng-Jun Jiang, Shenzhen (CN); Chung-Chi Tseng, New Taipei (TW); Hong-Ye Zhang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/585,205

(22) Filed: Dec. 30, 2014

(65) Prior Publication Data
US 2015/0183550 A1    Jul. 2, 2015

(30) Foreign Application Priority Data
Dec. 30, 2013    (CN) .......................... 2013 1 0739331

(51) Int. Cl.
*B65D 85/00* (2006.01)
*G06F 1/16* (2006.01)
*F16M 11/10* (2006.01)
*A45C 11/00* (2006.01)

(52) U.S. Cl.
CPC .............. *A45C 11/00* (2013.01); *G06F 1/1613* (2013.01); *A45C 2011/003* (2013.01); *A45C 2200/15* (2013.01)

(58) Field of Classification Search
CPC ............. B65D 5/52; G06F 1/16; F16M 11/10
USPC ....................... 206/320; 361/679.55; 248/688
See application file for complete search history.

(56) References Cited

U.S. PATENT DOCUMENTS

| | | | | |
|---|---|---|---|---|
| D687,438 | S * | 8/2013 | Lu ................................. | D14/440 |
| 8,640,864 | B2 * | 2/2014 | Chen ..................... | G06F 1/1626 206/320 |
| D713,847 | S * | 9/2014 | Su ................................. | D14/440 |
| 8,820,695 | B2 * | 9/2014 | Nakada et al. ................ | 248/454 |
| 2013/0020216 | A1 * | 1/2013 | Chiou ........................... | 206/320 |
| 2013/0146482 | A1 * | 6/2013 | Huang ....................... | 206/45.23 |
| 2013/0258586 | A1 * | 10/2013 | Shao et al. ............... | 361/679.55 |

(Continued)

*Primary Examiner* — J. Gregory Pickett
*Assistant Examiner* — Jennifer N Zettl
(74) *Attorney, Agent, or Firm* — Novak Druce Connolly Bove + Quigg LLP

(57) ABSTRACT

A protection case includes a receiving portion for receiving an electronic device and a cover portion connected to one side of the receiving portion for supporting or covering the receiving portion. The cover portion includes a first reinforcing member, a second reinforcing member adjacent to the first reinforcing member, two third reinforcing members symmetrically located at two opposite sides of the first reinforcing member, and two fourth reinforcing members symmetrically located at two opposite ends of the cover portion. The first, second, third and fourth reinforcing members are connected flexibly to each other. The first reinforcing member is folded toward and absorbed on the second reinforcing member. Each of the two third reinforcing members together with the adjacent fourth reinforcing member forms a supporting portion to abut against the back of the receiving portion.

14 Claims, 6 Drawing Sheets

(56) References Cited

U.S. PATENT DOCUMENTS

| | | | |
|---|---|---|---|
| 2015/0151871 A1* | 6/2015 | Huang | H05K 5/0086 206/45.23 |
| 2015/0183550 A1* | 7/2015 | Jiang | A45C 11/00 206/766 |
| 2015/0296643 A1* | 10/2015 | Lee | F16M 11/00 206/45.2 |

* cited by examiner

PROTECTION CASE FOR ELECTRONIC DEVICE

FIELD

The subject matter herein generally relates to a protection case for an electronic device.

BACKGROUND

Electronic devices are often used with a protection case to protect the device from damage or shock. The protection case can be a single case or a complex cover.

BRIEF DESCRIPTION OF THE DRAWINGS

Implementations of the present technology will now be described, by way of example only, with reference to the figures.

DETAILED DESCRIPTION

Figure 1:
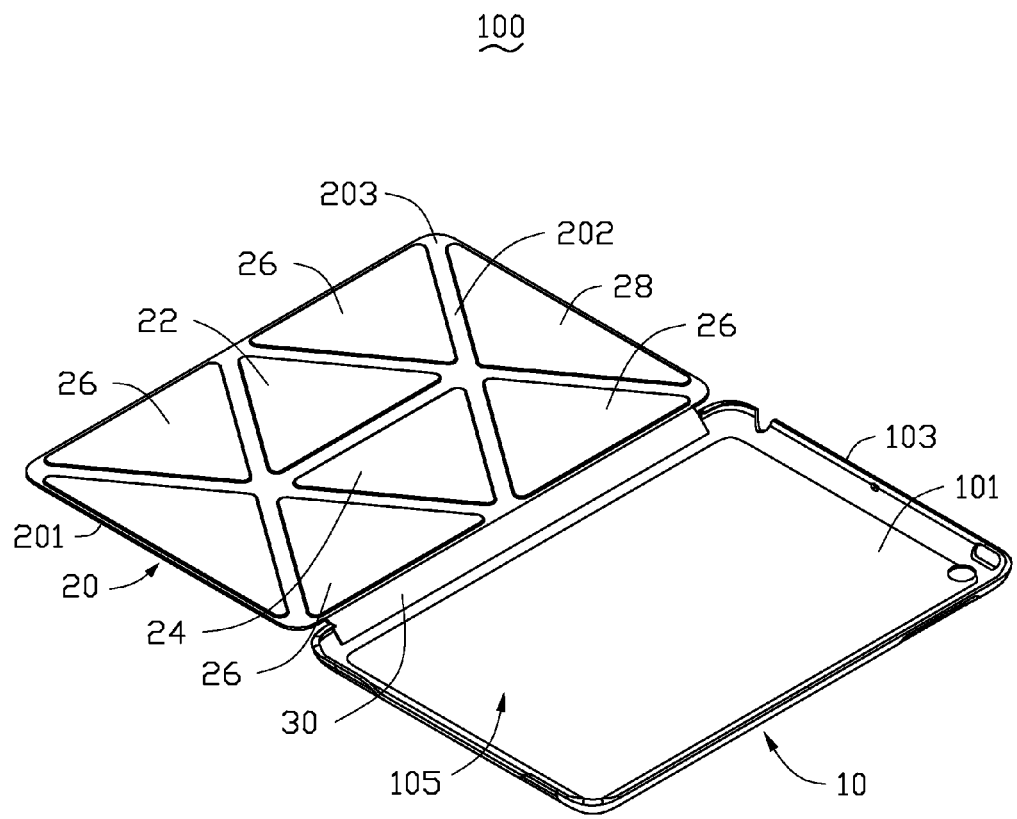
FIG. 1 is an isometric view of an embodiment of a protection case and an electronic device, wherein the protection case includes a receiving portion and a cover portion.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiment described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure described in relation to a protection case capable of holding and supporting an electronic device.

FIG. 1 illustrates an embodiment of a protection case 100. The protection case 100 includes a receiving portion 10 and a cover portion 20 coupled to the receiving portion 10. In this embodiment, the cover portion 20 can be pivotally connected to the receiving portion 10 using a flexible rubber strip 30.

The receiving portion 10 includes a substantially rectangular base plate 101 and an edge 103 extending from a peripheral of the base plate 101. The base plate 101 and the edge 103 define a receiving space 105 for holding an electronic device 50. In the embodiment, the electronic device 50 is a handheld device, such as a mobile phone or a pad. A first edge of the flexible rubber strip 30 is coupled to the base plate 101, and a second edge of the flexible rubber strip 30, opposite to first edge is coupled to the cover portion 20. In this embodiment, the receiving portion 10 is a hard shell, made of, for example, plastic, carbon fiber or glass fiber.

The cover portion 20 is substantially rectangular and comprises a substantially isosceles triangle-shaped first reinforcing member 22, an isosceles triangle-shaped second reinforcing member 24, four isosceles triangle-shaped third reinforcing members 26, and two isosceles triangle-shaped fourth reinforcing members 28. The first reinforcing member 22, the second reinforcing members 24, the third reinforcing members 26, and the fourth reinforcing member 28 are encapsulated between a first surface layer 201 and a second surface layer 203 of cover portion 20. The first surface layer 201 is an outer surface of the cover portion 20, formed of, for example, leather, and the second surface layer 203 is an inner surface of the cover portion 20, formed of, for example, microfiber layer. In areas lacking reinforcing members, the first surface layer 201 and the second surface layer 203 are connected together to form thinner foldable lines 202 between the first reinforcing member 22, the second reinforcing members 24, the third reinforcing members 26, and the fourth reinforcing member 28.

Each reinforcing member 22, 24, 26, 28 has a base and two equal sides. The first reinforcing member 22 is located at the middle of one side of the cover portion 20 away from the flexible rubber strip 30 with the base of the first reinforcing member 22 facing the flexible rubber strip 30. The second reinforcing members 24 is located at the middle of another side of the cover portion 20 adjacent to the flexible rubber strip 30 with the base of the second reinforcing members 24 parallel and symmetric to the base of the first reinforcing member 22. The four third reinforcing members 26 are symmetrically located at two opposite sides of the first reinforcing member 22 and two opposite sides of the second reinforcing member 24 respectively. The two third reinforcing members 26 are symmetrically located at two opposite sides of the first reinforcing member 22, and each side of the third reinforcing member 26 adjacent to the first reinforcing member 22 is parallel to the side of the first reinforcing member 22. Another two third reinforcing members 26 are symmetrically located at two opposite sides of the second reinforcing member 24, and the other side of the third reinforcing member 26 adjacent to the second reinforcing member 24 is parallel to the side of the second reinforcing member 24. The two fourth reinforcing members 28 are symmetrically located at two ends of the cover portion 20 between the two third reinforcing members 26, and the two sides of each fourth reinforcing member 28 are respectively adjacent and parallel to the two sides of the two third reinforcing members 26.

The first reinforcing member 22 and the second reinforcing members 24 are made of magnetic materials, and the first reinforcing member 22 and the second reinforcing members 24 can be integrated with each other. In the other embodiment, the first reinforcing member 22 and the second reinforcing members 24 can be isosceles trapezoid.

Each of the third reinforcing member 26 and the fourth reinforcing member 28 are made of hard board, such as such as fiberglass, carbon fiber board, cardboard or plastic board.

Figure 2:
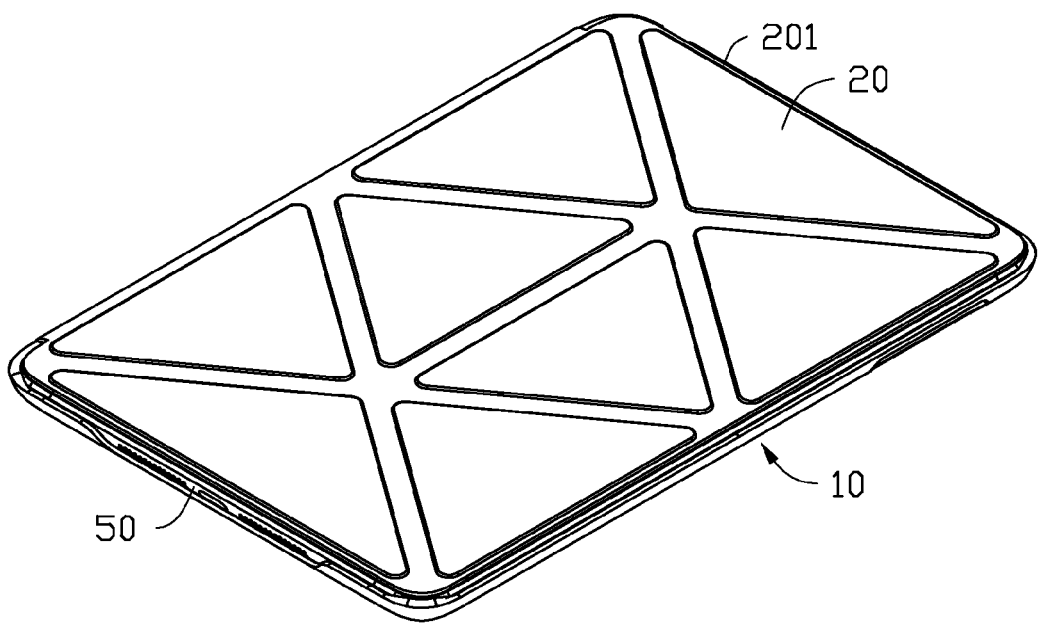
FIG. 2 is an assembled, isometric view of FIG. 1, showing the cover portion covering the receiving portion.

FIG. 2 illustrates that the electronic device 50 is held in the receiving portion 10, and the cover portion 20 is rotated to cover the receiving portion 10 to protect the electronic device 50.

Figure 3:
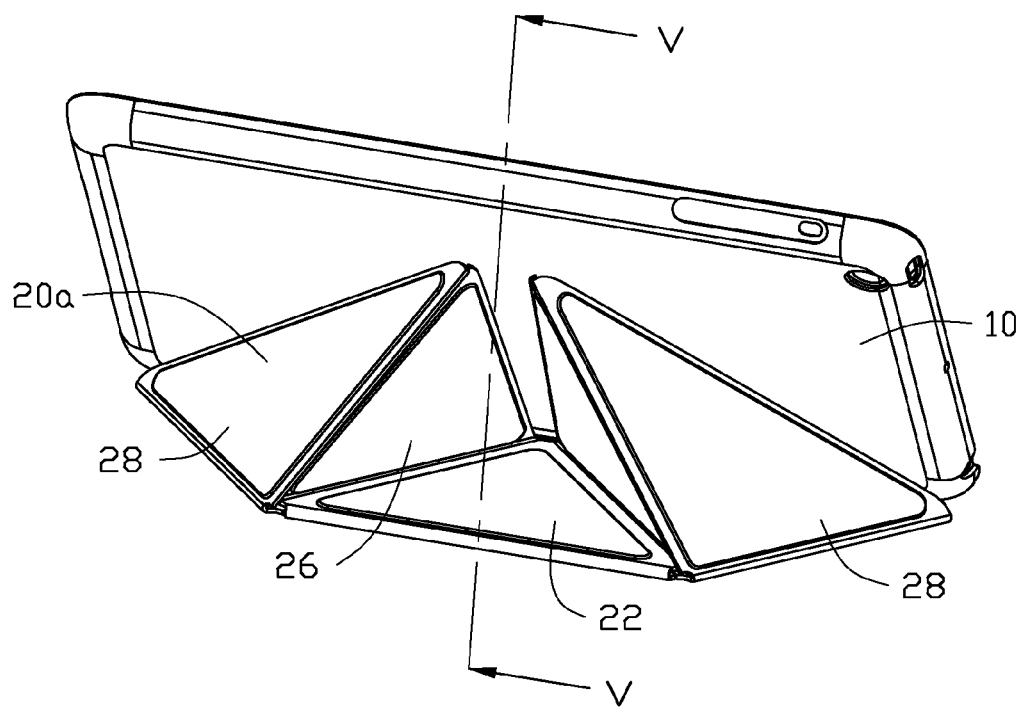
FIG. 3 is an assembled, isometric view of FIG. 1, showing the cover portion folded to support the receiving portion.
Figure 4:
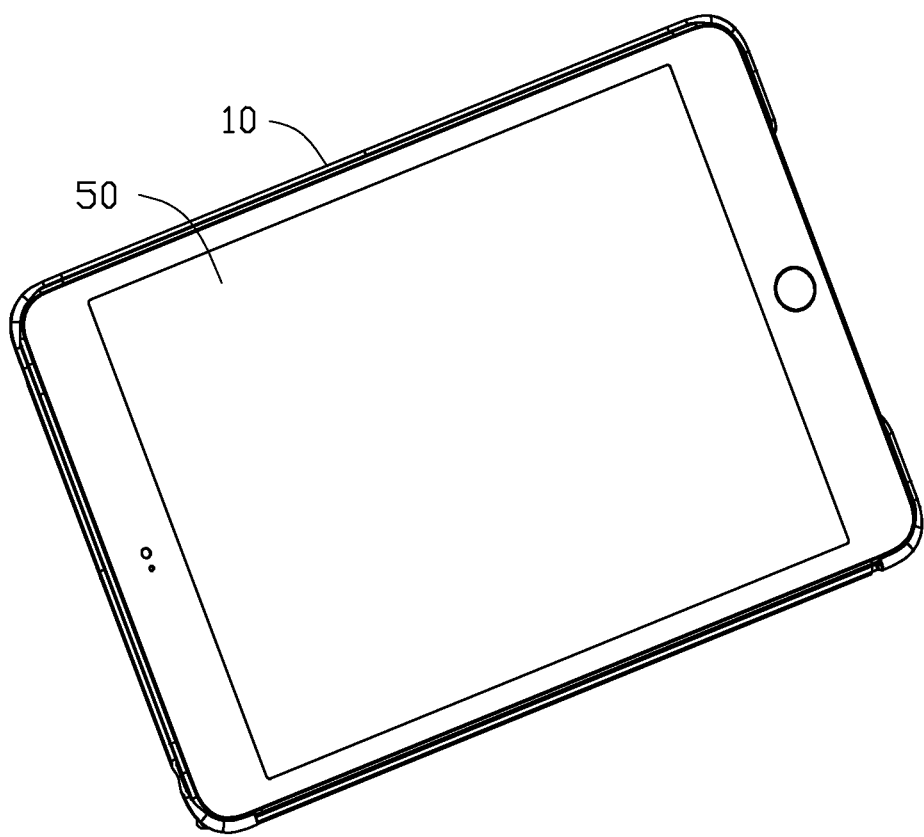
FIG. 4 is similar to FIG. 3, but viewed from another aspect.
Figure 5:
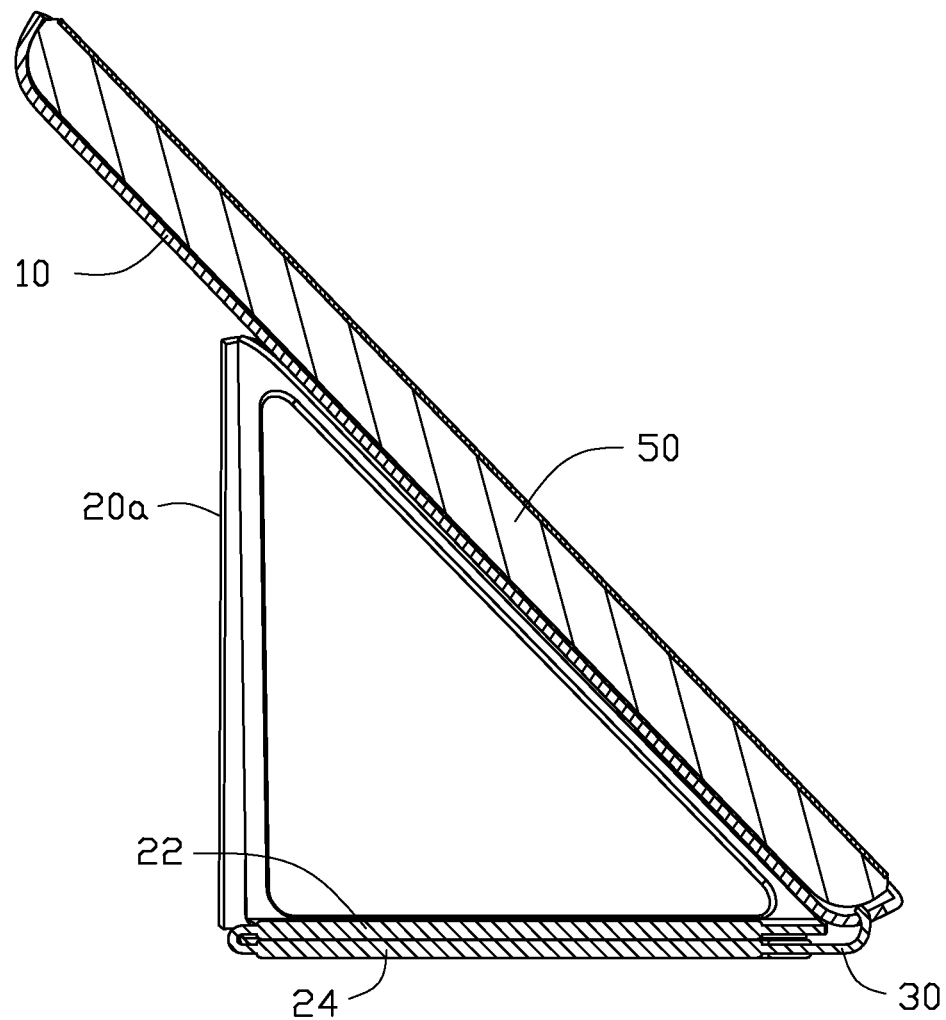
FIG. 5 is a cross-sectional view along line V-V of FIG. 3.

FIGS. 3 to 5 illustrate the electronic device 50 when supported by the folded cover portion 20, the first reinforcing member 22 is folded toward the second reinforcing member 24. The first reinforcing member 22 can contact the second reinforcing member 24 when the first reinforcing member 22 is folded on the second reinforcing member 24, here, the first reinforcing member 22 can be detachably fixed on the second reinforcing member 24 by magnetic force or other fixing device. The two third reinforcing members 26 are located at the two sides of the first reinforcing member 22 and the two fourth reinforcing members 28 are folded to form two pyramid-shaped supporting portions 20a to support the back of the receiving portion 10.

Figure 6:
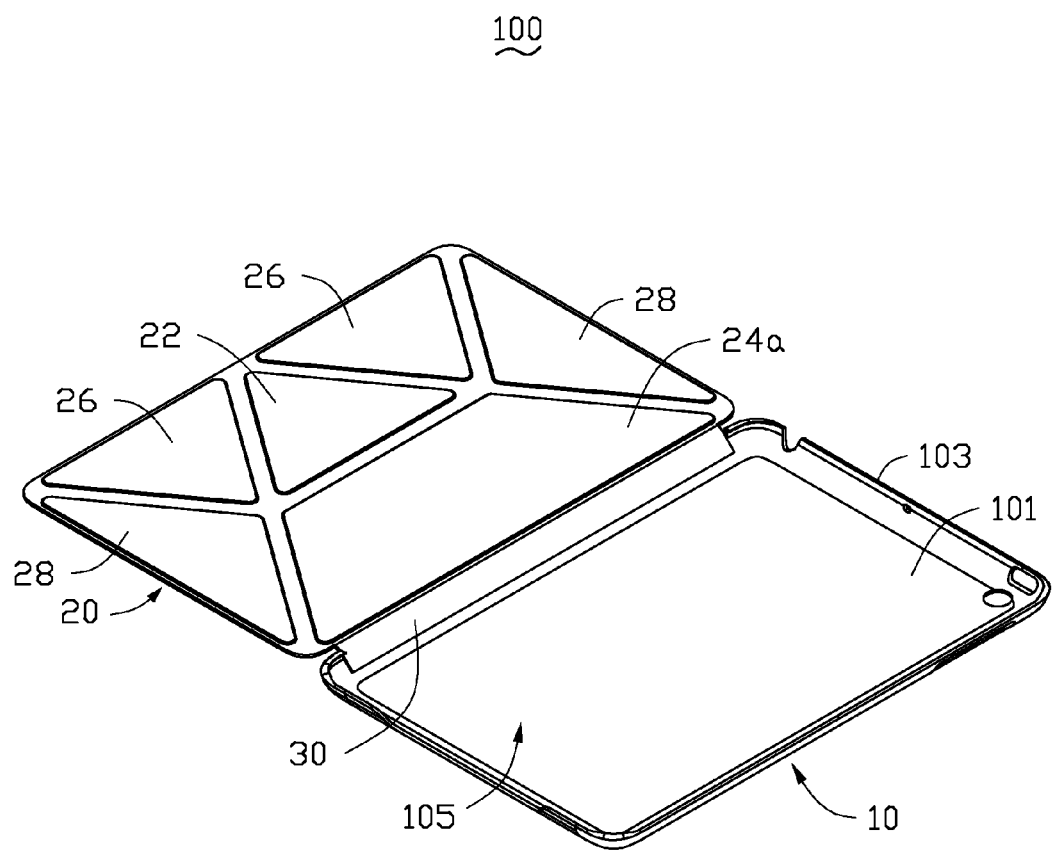
FIG. 6 is an isometric view of another embodiment of the protection case.

FIG. 6 illustrates that in another embodiment of the protection case 100, the cover portion 20 comprises an isosceles triangle-shaped first reinforcing member 22, an isosceles trapezoid-shaped second reinforcing member 24a, two isosceles triangle-shaped third reinforcing members 26, and two isosceles triangle-shaped fourth reinforcing members 28. The second reinforcing member 24a comprises two parallel bases and two equal sides slantingly connected between the two bases. Each side of the second reinforcing member 24a is respectively adjacent and parallel to one side of the fourth reinforcing member 28. And the first reinforcing member 22 and the second reinforcing member 24a are made of magnetic materials, and the first reinforcing member 22 and the second reinforcing members 24a can be integrated with each other.

The receiving portion 10 of the protection case 100 can hold the electronic device 50, the cover portion 20 can be rotated to cover the receiving portion 10 and protect the electronic device 50. And the cover portion 20 can also be folded to support the back of the receiving portion 10 to support the electronic device 50.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A protection case comprising:
a receiving portion for receiving an electronic device therein; and a cover portion coupled to the receiving portion to cover or support the electronic device, the cover portion comprising a first reinforcing member, a second reinforcing member adjacent to the first reinforcing member, two third reinforcing members symmetrically located at two opposite sides of the first reinforcing member, and two fourth reinforcing members symmetrically located at two opposite ends of the cover portion;
wherein the first, second, third and fourth reinforcing members are connected flexibly to each other;
wherein the cover portion is rotatably connected to the receiving portion through a strip, each of the first and second reinforcing members comprise a base and two symmetrical equal sides connected to opposite sides of the base, the first reinforcing member is located at a middle of one side of the cover portion away from the strip with the base of the first reinforcing member facing and parallel to the strip, the second reinforcing members is located at a middle of an opposite side of the cover portion adjacent to the strip with the base of the second reinforcing members parallel and adjacent to the base of the first reinforcing member, the first reinforcing member is capable of being folded toward the second reinforcing member, each of the two third reinforcing members together with the adjacent fourth reinforcing member are capable of forming a supporting portion to abut against the back of the receiving portion to support the electronic device; and wherein the first, second, third and fourth reinforcing members are isosceles triangles.

2. The protection case of claim 1, wherein the receiving portion comprises a base plate and an edge extending from edges of the base plate, the base plate and the peripheral form a receiving space for receiving the electronic device.

3. The protection case of claim 1, wherein the strip is a flexible rubber strip.

4. The protection case of claim 1, wherein each of the third and fourth reinforcing members comprise a base and two symmetrical equal sides connected to opposite sides of the base, one of the symmetrical equal sides of each third reinforcing member adjacent to the first reinforcing member is parallel to the adjacent side of the first reinforcing member, and one of the symmetrical equal sides of each fourth reinforcing member is adjacent and parallel to an adjacent one of the sides an adjacent one of the third reinforcing members.

5. The protection case of claim 4, wherein the cover portion further comprises two third reinforcing members symmetrically located beside opposite sides of the second reinforcing member, each of the further third reinforcing members is located between the second reinforcing member and an adjacent one of the two fourth reinforcing members, and two sides of each of the further third reinforcing members are respectively adjacent and parallel to the adjacent sides of the second reinforcing member and the adjacent fourth reinforcing member.

6. The protection case of claim 1, wherein the first reinforcing member and the second reinforcing member are made of magnetic materials, and the first reinforcing member and the second reinforcing members are capable of being absorbed to each other.

7. The protection case of claim 1, wherein the third and fourth reinforcing members are made of hard boards.

8. The protection case of claim 1, wherein the first, second, third and fourth reinforcing members are encapsulated between a first surface layer and a second surface layer of the cover portion, the first surface layer is an outer surface of the cover portion, and the second surface layer is an inner surface of the cover portion, in areas lacking reinforcing members, the first surface layer and the second surface layer are connected together to form thinner foldable lines between the first reinforcing member, the second reinforcing member, the third reinforcing members, and the fourth reinforcing members.

9. A cover comprising:
a first reinforcing member located at a middle of one side of the cover, a second reinforcing member located at a middle of an opposite side of the cover, two third reinforcing members symmetrically located at two opposite sides of the first reinforcing member, and two fourth reinforcing members symmetrically located at two opposite ends of the cover;
wherein the first, second, third and fourth reinforcing members are connected flexibly to each other;
wherein each of the first and second reinforcing members comprise a base and two symmetrical equal sides connected to opposite sides of the base, the bases of the first and second reinforcing members are adjacent to each other and parallel to the opposite sides of the cover, the first reinforcing member is capable of being folded toward and fixed on the second reinforcing member, each of the two third reinforcing members together with the adjacent fourth reinforcing member are capable of forming a supporting portion for supporting an electronic device; and wherein the first, second, third and fourth reinforcing members are isosceles triangles.

10. The cover of claim 9, wherein the cover further comprises two third reinforcing members symmetrically located beside opposite sides of the second reinforcing member, each of the further third reinforcing members is located between the second reinforcing member and an adjacent one of the two fourth reinforcing members.

11. The cover of claim 9, wherein the first reinforcing member and the second reinforcing member are made of magnetic materials, and the first reinforcing member and the second reinforcing members are capable of being absorbed to each other.

12. The cover of claim 9, wherein the third and fourth reinforcing members are made of hard boards.

13. The cover of claim 9, wherein the first, second, third and fourth reinforcing members are encapsulated between a first surface layer and a second surface layer of the cover, the first surface layer is an outer surface of the cover, and the second surface layer is an inner surface of the cover, in areas lacking reinforcing members, the first surface layer and the second surface layer are connected together to form thinner foldable lines between the first reinforcing member, the second reinforcing member, the third reinforcing members, and the fourth reinforcing members.

14. The cover of claim 9, wherein the supporting portion is pyramid-shaped.

* * * * *